Jan. 21, 1947.  H. H. DYAR  2,414,511
METHOD OF AND APPARATUS FOR CLADDING METAL BODIES IN TRANSIT
Filed June 21, 1941
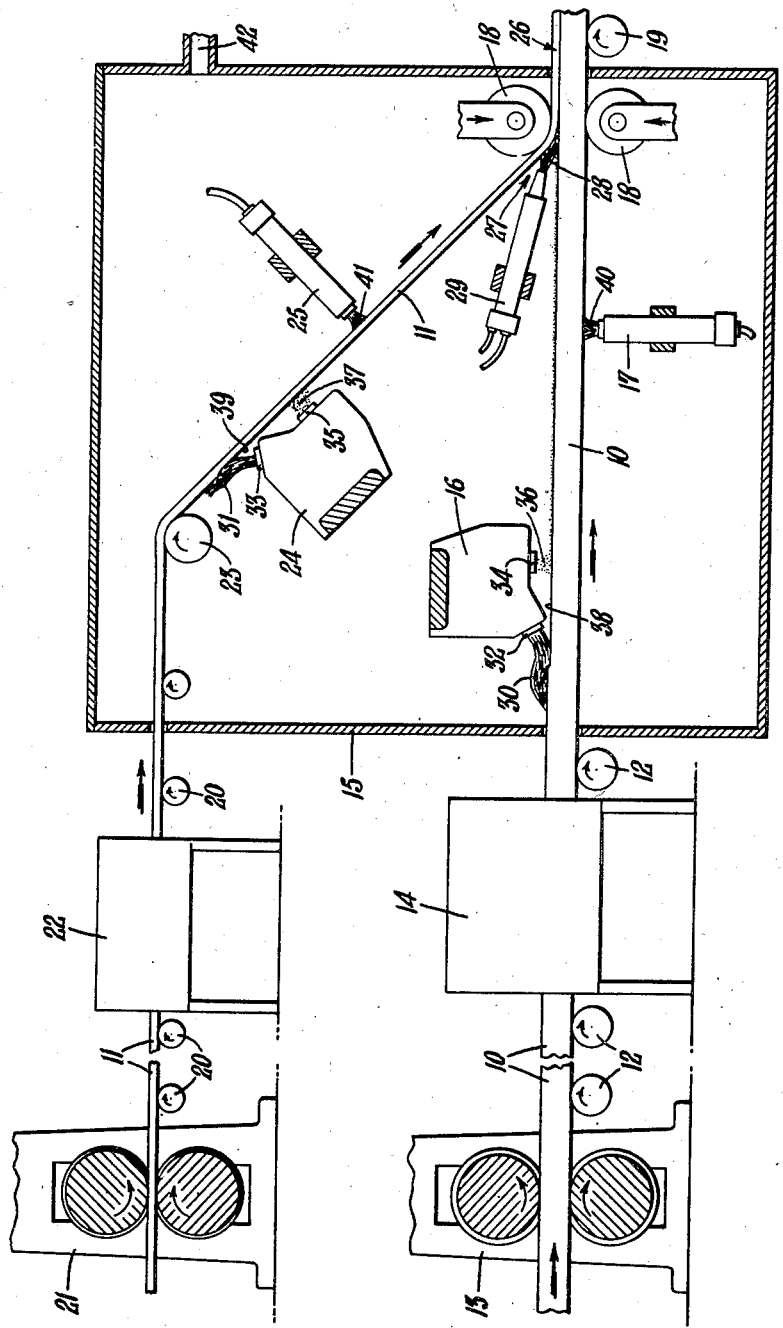
INVENTOR
HUGH H. DYAR
BY
ATTORNEY Patented Jan. 21, 1947

2,414,511

UNITED STATES PATENT OFFICE

2,414,511

METHOD OF AND APPARATUS FOR CLADDING METAL BODIES IN TRANSIT

Hugh H. Dyar, Warrensville, Ohio, assignor to The Linde Air Products Company, a corporation of Ohio Application June 21, 1941, Serial No. 399,180

12 Claims. (Cl. 78—90)

This invention relates to the art of uniting different metals and more particularly to a method of and apparatus for cladding a moving body of corrodible metal, such as iron or steel, with a moving strip of metal relatively more resistant to corrosion.

The main object of this invention is to provide a rapid process whereby a ferrous metal member may be clad continuously with another metal member on at least one face thereof in a single pass. Another object of the invention is to provide an improved continuous process of making bimetallic structures in general. Additional objects are to provide improved apparatus for carrying out such process during the manufacture of a ferrous metal member while in transit from a blooming mill to subsequent processes on a transfer table; means for uniformly uniting a member of one metal with a member of another metal to obtain a composite metal body; improved means for insuring a positive bond between a cladding metal member and a base metal member; and an improved method of and apparatus for continuously uniting metal members.

Briefly, there is provided in accordance with the invention, an improved method of an apparatus for continuously uniting one metal member, such as a ferrous metal body, with another metal member, such as a corrosive resistant metal strip, which includes first preheating the metal members; then subjecting one or both of the surfaces to be joined to a skinning or thermochemical desurfacing operation preferably with oxygen; applying flux to one or both of the clean surfaces, preferably while still hot and under the influences of the desurfacing operation, and finally subjecting both of the surfaces as they are united to a heating flame while compressing the members between pressure rolls to produce a composite body of metal. Flux may be applied to the skinned desurfaced area immediately after the skinning or desurfacing operation or during the combining operation along with the welding flame or both, as desired.

Referring to the drawing:

The single figure is a diagrammatic view mainly in side elevation of apparatus embodying features of the invention.

It is well known to those skilled in the art of joining or welding metal members, that the surfaces to be joined must be free entirely of foreign matter, such as the various forms of oxide and other particles. Furthermore, it is known that the metals to be joined must be raised to a temperature that will cause a positive bond to be formed therebetween.

Referring to the drawing, a member 10 of base metal to be clad, and a cladding material 11 in the form of a metal strip of the desired thickness and of a length and width sufficient to cover one face of the plate 10 are shown in position during the continuous welding operation. The metal member 10 is moved continuously in the direction of the arrow by a suitable table or conveyor including supporting rolls 12, first through a blooming roll stand 13, then through a preheating furnace 14, into a muffle 15, then under a skinning or desurfacing unit 16, then above a row of heating blowpipes 17, then through cooperating squeeze rolls 18, 18 which are adapted to compress the composite metal body 26 between them during the welding operation, and finally out of the muffle 15 onto a roll table 19. The strip 11 of cladding material is, at the same time, continuously moved by a suitable table or conveyor including rolls 20 in the direction of the arrow through a roll stand 21, then through a preheating furnace 22, into the muffle 15, over a roll 23, then over a skinning or desurfacing unit 24, under a row of heating blowpipes 25, and finally under the upper pressure roll 18 where it is united with the base metal member 10 to form the composite body 26.

The continuously moving base metal member 10 and the coating strip 11 are arranged to converge to an acute angle 27 therebetween in the vicinity of the rolls 18, and into this angle there is discharged heating or welding flame 28 from a series of water-cooled, preferably oxy-acetylene, welding blowpipes 29.

The thermochemical desurfacing units 16 and 24 may be machines similar to the apparatus described in Patent No. 2,200,259, Bucknam et al., dated May 14, 1940, which is capable of continuously desurfacing members, such as slabs of a wide range of widths. The streams 30 and 31 of oxygen and preheating flames discharged by the nozzles 32 and 33 of the desurfacing units 16 and 24, preferably are adjusted to take light desurfacing cuts off of the opposed sides of the metal members 10 and 11, preferably in the nature of a wash, forming very light ridges, between very shallow longitudinal grooves.

The units 16 and 24 are provided with nozzles 34 and 35, respectively, for applying any suitable flux 36 and 37 to the desurfaced areas of the members 10 and 11, preferably as soon as possible after the desurfacing operation. A volatile liquid flux may, instead, be applied to the surfaces to be united by means of the welding blowpipes 29. If desired, however, a suitable flux may be applied to the base metal surface by the nozzles 34 on the desurfacing unit 16 and to the surfaces of the cladding material and to the base metal by the welding blowpipes 29. In addition, if desired, in case the desurfacing units 16 and 24 are not used, the preheating furnaces 14 and 22 may be supplemented by separate oxy-acetylene blowpipes arranged to discharge their flames, with a volatile liquid flux if desired, against the base metal member 10 or the strip 11 or both after leaving the preheating furnace so that the surfaces of the metals to be united are properly heated and prepared for welding as they are being combined between the rolls 18.

In the operation of the apparatus shown in the drawing, the member 10 of base metal, after being rolled in the roll stand 13, is heated in the furnace 14 to maintain a rolling temperature, for example, and in passing under the desurfacing unit 16 a layer of metal is thermochemically removed or washed from its upper surface, in a manner well understood by those skilled in the art, to provide a surface 38 that is hot and clean, at least the desurfaced area of the metal body 10 being raised to a temperature of about 2000° F. in the case of most steels. The surface 38 is then coated with flux discharged in streams 36 by nozzles 34. Meantime the strip 11 of cladding metal, after being rolled in the roll stand 21, is heated in the furnace 22 and in passing over the desurfacing unit 24 a layer of metal is thermochemically removed or washed from its lower surface, to provide a surface 39 that is also hot and clean. The surface 39 is then coated with flux discharged in streams 37 by the nozzles 35. The moving member 11 is then united with the moving member 10 between the pinch rolls 18 while the flux coated surfaces 38 and 39 are still hot as a result of the skinning or hot desurfacing operations, which heating may be augmented by flames 40 and 41 from blowpipes 17 and 25. Thus, both metals are heated to a high temperature, and when such metals are rolled together, by virtue of the additional heat supplied by the oxy-acetylene flame 28 and the pressure supplied by the rolls 18, the metal members 10 and 11 are progressively welded to form a union that is capable of withstanding ordinary working which usually first includes reduction of the thickness of the composite body 26 by further rolling or other means. As pointed out above, the member 10 may be of ferrous metal, such as iron or steel, while the cladding member 11 may be copper, Monel metal, stainless steel, or other suitable metal. Thus, the steel member 10 may, for example, be clad with a thin layer 11 of metal, such as copper, in a very economical, continuous and entirely automatic manner. The composite body 26 is of exceptionally high grade inasmuch as the joint thereof is free from impurities and mechanical imperfections.

Copper oxidizes rapidly at elevated temperatures and its thermal conductivity is so great that difficulty is experienced in raising the material to the required temperatures. It is for this reason that the cladding process of the present invention is preferably carried out in the muffle 15 in a controlled atmosphere supplied through inlet 42 in order to obtain the best results. Any other suitable device, however, may be provided for this purpose, such as a substantially closed chamber which merely excludes air from the parts being welded, in which case the necessary atmosphere is sufficiently provided by the operation of the desurfacing units 16 and 24 and the blowpipes 17, 25 and 29, in muffle 15 with inlet 42 closed or omitted.

In the apparatus shown, the desurfacing units are provided with a series of nozzles 34 and 35 which are adapted to discharge suitable flux 36 and 37 in the form of a powder or liquid on the new surfaces 38 and 39 of the base metal member 10 and the cladding metal member 11 immediately after the desurfacing operations so that the clean, hot surfaces 38 and 39 are each covered with a layer of flux which blankets and protects the surface metal from oxidation until they are united under heat and pressure at the welding station. In this way, the surfaces to be united are entirely protected and insulated until the actual welding operation takes place.

It will thus be appreciated that the invention takes advantage of the clean surface of the base metal immediately after thermochemically skinning or desurfacing and before the formation of oxide, and also utilizes the additional heat input of the desurfacing operation in uniting metals, and although the invention is particularly useful in the cladding of a ferrous metal base member with another metal member, it should be understood that the principles of the invention may be applied to continuous welding in general where the metal members to be united are of similar composition and any additional welding material is employed.

If the metal members 10 and 11 are being rolled at a rolling temperature, the preheating furnaces 14 and 22 may, if desired, be dispensed with. Also, while the invention has been disclosed in the cladding of only one face of the ferrous metal member 10 in a single pass, it will be understood that two or more or all of the faces of such member may be clad at the same time in a single pass in accordance with the invention, so that, if desired, the member 10 may be completely clad between rolling stages in an otherwise conventional rolling mill, in a convenient, rapid and economical manner.

What is claimed is:

1. Apparatus for continuously uniting separate flat metal members comprising, in combination, a desurfacing station, a uniting station provided with pressure means and with blowpipe means for producing a heating flame, means for conveying a first metal member through said desurfacing station to provide a clean hot surface thereon and finally through said uniting station, and means for conveying a second metal member through said uniting station, said pressure means being adapted to unite said clean hot surface of said first metal member with a surface of said second metal member while both of said surfaces are heated by said flame as said members are subjected to compression by said pressure means.

2. Apparatus for continuously uniting separate flat metal members comprising, in combination, a pair of preheating stations, a pair of desurfacing stations, a uniting station provided with pressure means and with blowpipe means for producing heating flame, means for conveying a first metal member through one of said preheating stations, then through one of said desurfacing stations to provide a clean hot surface thereon and finally through said uniting station, and means for conveying a second metal member through the other one of said preheating stations then through the other of said desurfacing stations to provide a clean hot surface thereon and finally through said uniting station, said pressure means being adapted to unite said clean hot surfaces while both of said surfaces are heated by said flame as said members are subjected to compression by said pressure means.

3. Apparatus for continuously uniting separate continuous flat metal members comprising, in combination, a pair of preheating stations, a desurfacing station, a uniting station provided with pressure rolls and with blowpipe means for producing heating flame, means for conveying a first metal member through one of said preheating stations, then through said desurfacing station to provide a clean hot surface thereon and finally through said uniting station, and means for conveying a second metal member through the other one of said preheating stations and finally through said uniting station, said pressure rolls being adapted to unite said clean hot surface of said first metal member with a surface of said second metal member while both of said surfaces are heated by said flame as said members are subjected to compression between said pressure rolls.

4. Apparatus for continuously uniting separate continuous flat metal members comprising, in combination, a uniting station provided with pressure means and with blowpipe means for producing flame, and means for conveying separate metal members through said uniting station, said pressure means being adapted to unite the contacting surfaces of said members while said surfaces are treated by said flame as said members are subjected to compression by said pressure means.

5. The process of cladding a body of metal which comprises thermochemically desurfacing at least one side of a moving body of base metal to produce a clean surface thereon, thermochemically desurfacing at least one side of a moving strip of cladding metal to produce a clean surface thereon, simultaneously feeding said body of base metal and said strip of cladding metal in convergent paths with their desurfaced sides toward each other to bring such clean surfaces thereof together at an angle while they still retain heat imparted thereto by such desurfacing steps, directing a heating flame and a flux into the angle between such converging heated desurfaced sides to increase the temperature thereof and to apply flux to both of said clean surfaces as they converge, and pressing said clean heated surfaces together at the region of their convergence, whereby said body and said strip are progressively united to form a composite metal body.

6. A method of making a clad metal member which comprises thermochemically removing metal from a surface of a moving metal base, to provide a new clean surface on said base and to impart heat to such clean surface; feeding in convergent paths said base and a moving cladding metal body having a clean surface opposite such surface of said base, to bring the two clean surfaces into opposed relation while the new surface of said base is still clean and still retains heat imparted thereto by such metal removing operation; and progressively pressing such opposed clean heated surfaces together to unite them to produce a clad metal member.

7. Apparatus for making a clad metal member which comprises, in combination, means for thermochemically removing metal from a surface of a moving metal base to provide a new clean surface on said base and to impart heat to said clean surface; means for cleaning and heating a surface of a cladding metal body; mechanism for feeding said base and said body in convergent paths, to bring together into opposed relation the two clean surfaces thereof while said clean surface of the base still retains heat imparted thereto by such metal removing means; and means for progressively pressing such opposed surfaces together to unite said base and said body and produce a clad metal member.

8. A method of uniting a metal cladding member to a metal base member to produce a unitary clad metal body, said method comprising removing a layer of metal from a side of one of such members to provide a new clean surface on such member; progressively bringing a surface of the other of said members into contact with said new clean surface; progressively heating said surfaces and coating them with flux before they are brought into mutual contact; and progressively pressing together such heated flux-coated surfaces to unite them.

9. A method of uniting a metal cladding member to a metal base member to produce a unitary clad metal body, said method comprising progressively thermochemically removing a layer of metal from a side of one of such members, to provide a new clean surface on such member and to impart heat to said new clean surface; progressively heating a surface of the other of such members and bringing the heated surface of such other member into contact with said new clean surface while the latter still retains heat imparted thereto by such thermochemical metal-removing operation; and progressively pressing together such heated mutually-contacting surfaces to unite them.

10. A method of uniting a metal cladding member to a metal base member to produce a unitary clad metal body, said method comprising thermochemically removing a layer of metal from a side of said metal base member to provide a new clean surface on said base member and to impart heat to said new clean surface; propelling a metal cladding member in a path converging relatively to said base member to progressively bring a surface of said cladding member into contact with said new clean surface while the latter still retains heat imparted thereto by such thermochemical metal-removing operation; continuously directing a heating flame against both said surface of said cladding member and said new clean surface and into the angle between them as they converge into contact; and progressively pressing together said members and their mutually-contacting heated surfaces to unite them.

11. A method of uniting a metal cladding member to a metal base member, as claimed in claim 10, wherein heat is applied to said base member and to said cladding member before said members are heated by said heating flame; and flux is applied to the opposed surfaces of said members before they are pressed together.

12. A method of uniting a metal cladding member to a metal base member to produce a unitary clad metal body, said method comprising thermochemically removing a layer of metal from a side of said metal base member to provide a new clean surface thereon and to impart heat to said new clean surface of said base member; thermochemically removing a layer of metal from a side of said metal cladding member to provide a new clean surface thereon and to impart heat to said new clean surface of said cladding member; propelling said members in converging paths to progressively bring such new clean surfaces thereof into contact while said surfaces still retain heat imparted thereto by such thermochemical metal-removing operations; applying heat to each of said members before they are brought into contact; directing a heating flame against both of said new clean surfaces and into the angle between them as they converge into contact; applying flux to said new clean surfaces before they converge into contact; and progressively pressing together said members and their mutually-contacting heated surfaces to unite them.

HUGH H. DYAR.